Figure 1:
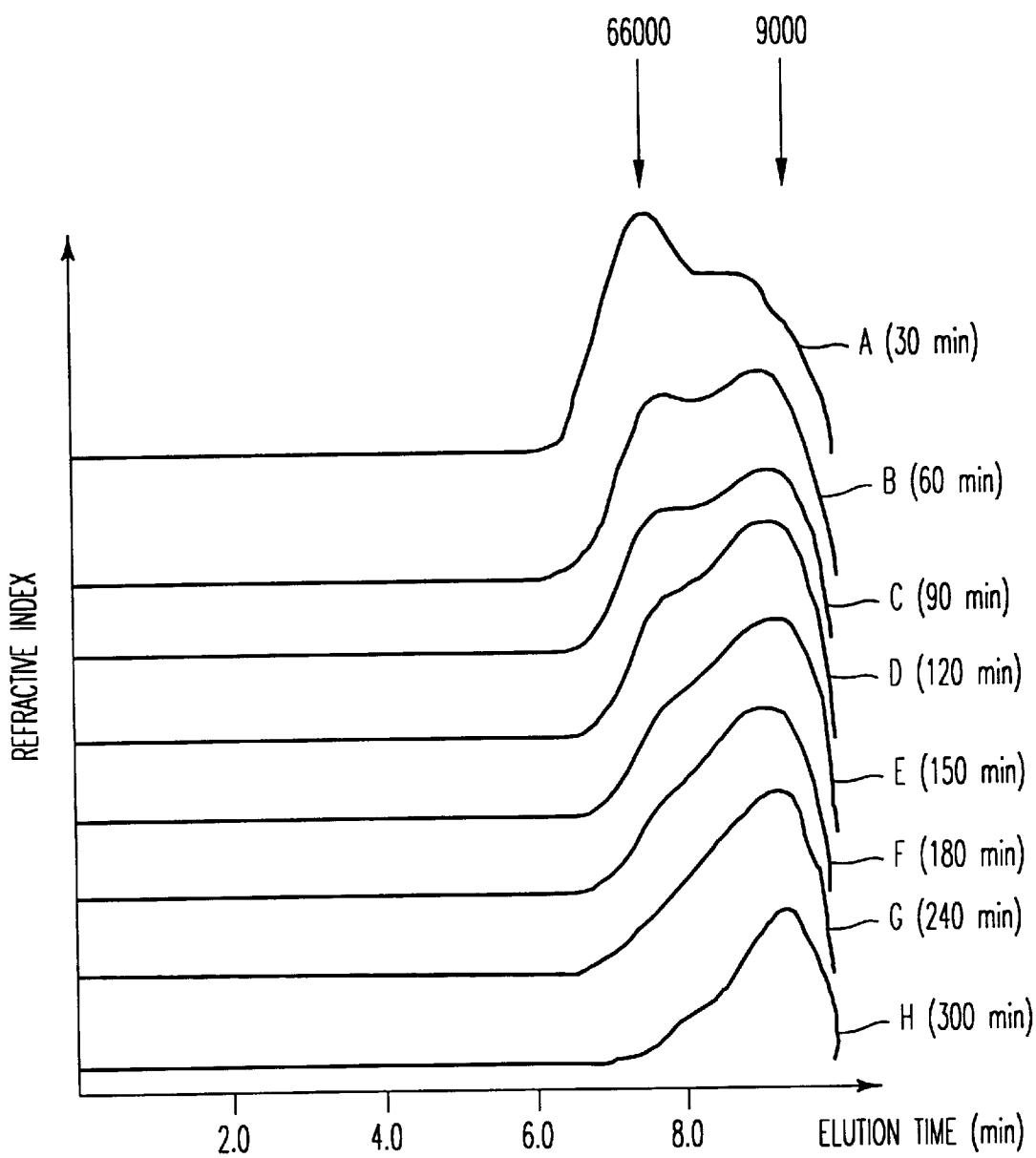

United States Patent [19]

Nardella et al.

[11] Patent Number: 6,028,191
[45] Date of Patent: Feb. 22, 2000

[54] METHOD FOR OBTAINING SULPHATED POLYSACCHARIDES

[75] Inventors: Alain Nardella, Creteil; Frédéric Chaubet, Eaubonne; Corinne Sinquin; Sylvia Colliec Jouault, both of Nantes; Catherine Boisson-Vidal, Paris; Patrick Durand, Rezé ; Jacqueline Jozefonvicz, Lamorlaye, all of France

[73] Assignees: Centre National de la Recherche Scientifique (CNRS), Paris; Institut Francais de Recherche Pour L'Exploitation de la Mer (Ifremer), Issy-les-Moulineaux, both of France

[21] Appl. No.: 09/011,750

[22] PCT Filed: Aug. 23, 1996

[86] PCT No.: PCT/FR96/01314

§ 371 Date: May 6, 1998

§ 102(e) Date: May 6, 1998

[87] PCT Pub. No.: WO97/08206

PCT Pub. Date: Mar. 6, 1997

[30] Foreign Application Priority Data

Aug. 24, 1995 [FR] France .................................. 95 10045

[51] Int. Cl.[7] .................................................. C08B 37/00
[52] U.S. Cl. .......................... 536/124; 536/118; 536/122; 536/123; 536/123.1
[58] Field of Search ..................................... 536/118, 122, 536/123, 123.1, 124

[56] References Cited

U.S. PATENT DOCUMENTS 4,552,675  11/1985  Brown et al. ....................... 252/8.55 R
5,321,133   6/1994  Colliec et al. ........................... 536/118

OTHER PUBLICATIONS

Momeclature of Carbohydrates (http://www.chem.qm-w.ac.uk/iupac/2carb/39.html), 1996.

Hjerde et al., "Conformation–dependent depolymerization kinetics of polysaccharides studies by visocisty ,measurements", Carbohydrate Polymers, vol. 24(4): 265–275, 1994.

Paskins–Hurlburt et al., "Fucoidan: It's Binding of Lead and Other Metals", Botanica Marina, vol. 21: 13–22, 1978.

The Carbohydrates (Vol. IB), edited by Pigman and Horton, Academic Press, pp. 551–553, 1970.

Nagumo et al., "Fucan Sulfates and Their Anticoagulant Activities", Polysaccharides in Medicinal Chemistry, edited by Severian Dumitriu, Marcel Dekker, Inc., pp. 545–574, 1996.

Nishino et al., "The Relationship Between the Molecular Weight and the Anticoagulant Activity of Two Types of Fucan Sulfates from the Brown Seaweed *Ecklonia kurome*", Agric. Biol. Chem., vol. 55(3):791–796, 1991.

Nishino et al., "Change in the Anticoagulant Activity and Composition of a Fucan Sulfate from the Brown Seaweed *Ecklonia kurome* During Refrigerated Storage of the Fronds", Botanica Marina, vol. 34: 387–389, 1991.

*Primary Examiner*—Howard C. Lee
*Attorney, Agent, or Firm*—Oblon, Spivak, McClelland, Maier & Neustadt, P.C.

[57] ABSTRACT

A method for obtaining sulphated polysaccharides using the free radical depolymerization of a fucan from Phaeophyceae in the presence of a metal catalyst and of hydrogen peroxide is described. The method of the invention provides polysaccharide fractions with a molecular weight of 10,000 g/mol or less, with anticoagulant properties.

11 Claims, 2 Drawing Sheets

METHOD FOR OBTAINING SULPHATED POLYSACCHARIDES

This application is a 371 of PCT/FR96/01314 which was filed on Aug. 23 1996.

The present invention relates to obtaining sulphated polysaccharides of low molecular weight by depolymerization of fucans extracted from Phaeophyceae.

The fucans sulfates are sulphated polysaccharides, present in the cell walls of shoots of brown algae. For simplicity the term "fucan" will be used to describe the fucan sulfates. The crude fucan extracted from shoots by acid extraction is formed of a heterogeneous population of molecules of high average molecular weight (100,000 to 800,000 g/mol), which are principally polymers of $\alpha$-1,2-L-fucose-4-sulphate. However, the fucans also contain a not inconsiderable proportion of other components, in particular of chains of uronic acids, and of neutral sugars such as D-xylose, and of D-galactose, and of D-mannose.

The fucans have different properties which make particularly interesting their use as a source of novel therapeutic active principles. It has thus been shown that they have anticoagulant, antithrombotic [T. NISHINO and T. NAGUMO, Carbohydr. Res. 229, p. 355–362, (1992); Application EP 0403 377; S. COLLIEC et al., Thromb. Res. 64, pp. 143–154 (1991); S. SOEDA et al., Thromb. Res. 72, pp. 247–256 (1993)], antiviral [M. BABA et al., J. AIDS, 3, pp. 493–492, (1990)], antiangiogenic [R. HAHNENBERGER and A. M. JACKOBSON, Glycoconjugate J., 8, 350–353 (1991)] and anti-complementary [C. BLONDIN et al., Molecular Immunology, 31, pp. 247–253, (1994)] activity. It has likewise been observed that they are able to act as modulators of cell adhesion [C. G. GLABE et al., J. Cell Sci., 61, pp. 475–490, (1983)], of the release of growth factors [D. A. BELFORT et al., J. Cell. Physiol. 157, pp. 184–189, (1993)], of the proliferation of tumour cells [M. ELLOUALI et al., Anticancer Research, 13, pp. 2011–2020 (1993); D. R. COOMBE et al., Int. J. Cancer, 39, pp. 82–90, (1987)] and block the spermatozoid/ovule interactions between different species [M. C. MAHONY et al., Contraception, 48, pp. 277–289, (1993); M. C. MAHONY et al., Contraception, 44, pp. 657–665, (1991)].

Despite their potential interest, and although some of their properties (for example their anticoagulant activity) have been known for a long time, the crude fucans have not been used in therapeutics because of their high molecular weight and their heterogeneity, which cause poor solubility, which makes the characterization of the active preparations and their reproducible obtainment very difficult.

During the above studies, the team of inventors perfected a method for the controlled lysis of crude fucan by acid hydrolysis (Application EP 0403 377), followed by fractionation by gel filtration, which allows polysaccharide fractions of molecular weight lower than or equal to 20,000 g/mol to be obtained. These fractions retain the properties of the crude fucan, such as the anticoagulant activity and the anti-complementary activity.

However, acid hydrolysis followed by fractionation only allows fractions of low molecular weight to be obtained in a moderate yield ($\leq 10\%$ of the crude starting fucan); in addition, the characterization of the fractions obtained by acid hydrolysis reveals a great heterogeneity of the polysaccharides in weight as in chemical composition.

Moreover, it has been shown that it was possible to obtain polysaccharide fractions of low molecular weight and of constant composition starting from heparin or from dermatan sulphate by employing a free-radical depolymerization reaction [VOLPI et al., J. Chromatogr. B Biomed. Appl. 622, pp. 13–20, (1993); Anal. Biochem. 200, pp. 100–107, (1992)]. The reaction proceeds by the formation of free radicals, originating from the reaction of a metallic ion ($Cu^{2+}$ or $Fe^{3+}$) with hydrogen peroxide [G. VAN DEDEM and J. I. NIELSEN, Pharmeuropa, 3, 202–218, (1990)]. These free radicals are very reactive and capable, at neutral pH, of degrading the polysaccharides more effectively than acid hydrolysis.

The inventors tried to carry out the free-radical depolymerization of a high molecular weight fraction (HMWF) of fucan by the action of hydrogen peroxide in the presence of copper acetate. The first attempts carried out while complying with the protocol described by VOLPI et al. led to the obtainment of fractions of molecular weight lower than 20,000 g/mol and of constant composition.

However, to obtain fractions of molecular weight lower than 10,000 g/mol, it was necessary to fractionate the free-radical depolymerization product by steric exclusion, with, as a consequence, a loss of product of close to 50%.

The inventors have now perfected a novel method of free-radical depolymerization, which allows homogeneous fractions of molecular weight lower than 10,000 g/mol to be obtained in a single step starting from crude fucan, and in a good yield, without it being necessary to proceed to a complementary fractionation by steric exclusion.

The subject of the present invention is a method of obtaining sulphated polysaccharides by free-radical depolymerization, characterized in that:

a) to a volume V1 of a reaction mixture comprising a crude fucan originating from Phaeophyceae at a concentration of between 5 mg/ml and 100 mg/ml, and in the presence of a metallic catalyst, is added a volume V2 of a solution of hydrogen peroxide at a concentration of between 5% and 30%, the addition being carried out continuously and with stirring for 0.5 hours to 10 hours at a rate per minute of between V1/1000 and V1/10, and the reaction mixture being maintained at a pH of between 6 and 8 by continuous addition of sodium hydroxide, and at a temperature of between 40 and 70° C., b) the polysaccharides resulting from this depolymerization are collected.

According to a preferred embodiment of the present invention, the crude fucan originating from Phaeophyceae is present in the reaction mixture at a concentration of between 10 mg/ml and 50 mg/ml.

According to another preferred embodiment of the present invention, a solution of hydrogen peroxide at a concentration of between 5% and 20%, preferably of the order of 9 to 10% and at a rate of between V1/50 and V1/500, preferably of the order of V1/100, is used.

Metallic catalysts which can be used for carrying out the present invention are, for example, those mentioned in European Patent 221 977 in the name of OPOCRIN S.pA. LABORATORIO FARMACOBIOLOGICO.

According to a preferred embodiment of the present invention, the metallic catalyst is present in the reaction mixture at a concentration of between 0.01 and 0.1 M, preferably between 0.01 and 0.05 M.

The method of free-radical depolymerization in accordance with the invention allows homogeneous polysaccharide fractions of molecular weight lower than or equal to 10,000 g/mol to be obtained in a single step, without preparative fractionation by steric exclusion chromatography, and in a good yield.

In the context of the explanation of the present invention, "homogeneous fraction" is understood as meaning a fraction which, on high-performance steric exclusion chromatography, has a single main peak representing a majority population in the fraction; the polydispersity index calculated from this peak gives a value of between 1 and 2.

Advantageously, the method in accordance with the invention additionally comprises an ion-exchange chromatography step, which can be carried out either before or after the free-radical depolymerization, and at the end of which the fraction is collected which, when the said chromatography is carried out on a DEAE-Sepharose CL6B column (PHARMACIA), is eluted at an ionic strength corresponding to an NaCl concentration of greater than 0.8 M, preferably of greater than 1 M.

A subject of the present invention is likewise polysaccharide fractions capable of being obtained by the method in accordance with the invention, such as defined above.

The present invention will be better understood with the aid of the additional description which will follow, and which refers to an example of obtaining fractions of sulphated polysaccharides starting from fucans extracted from brown algae, employing the method in accordance with the present invention.

EXAMPLE 1

Starting Material

Three preparations of fucan were tested as starting material; they were denoted respectively by the following abbreviations:

FS: preparation of fucoidan of *Fucus vesiculosus* marketed by SIGMA FRANCE.

EA: acid extract obtained starting from *Ascophyllum nodosum* according to the protocol described by S. COLLIEC et al. [Phytochemistry, 35, pp. 697–700, (1994)].

P1: fraction of high molecular weight obtained by acid treatment of EA, as described in European Patent Application 403 377 (page 13, Example 1, b) A).

Free-radical Depolymerization 600 mg of fucan and 80 mg of copper acetate monohydrate (0.02 M) are dissolved in 20 ml of double-distilled water, in a reactor maintained at 60° C. A solution of 9% (v/v) hydrogen peroxide is added at a rate of 12 ml per hour, and the pH is kept at 7.5 by continuous addition of 2 M NaOH. The reaction is stopped at the end of 5 hours. The pH is adjusted to 5 with acetic acid, then the chelating resin CHELEX® 100 (BIORAD) is added in order to remove the copper contaminant from the medium. After neutralization by 0.1 M sodium hydroxide, the solution is desalted and lyophilized.

Characterization of the Polysaccharide Fractions

The molecular weights of the different fractions of fucan were determined by high-performance steric exclusion chromatography (HPSEC), in 0.15 M NaCl, 0.05 M $NaH_2PO_4$, pH 7, using a LICROSPHER® Si300 column (MERK-CLEVENOT) and a HEMASEC® BIO40 column (ALLTECH). The columns were calibrated with the following polysaccharide standards: pullulans: 853,000–5800 g/mol (POLYMER LABORATORIES, INTERCHIM), dextran: 1500 g/mol and melezitose 522 g/mol (FLUKA), sucrose: 342 g/mol and glucose: 180 g/mol (SIGMA). The results are analysed using the CHROMSTAR® BRUKER software [marketed by MERK].

The fucose content was determined by the cysteine-$H_2SO_4$ method [Z. DISCHE, Method Biochem. Anal. 2, pp. 313–358, (1955)].

The uronic acids content was established using a modification of the m-hydroxybiphenyl-$H_2SO_4$ method [T. M. C. C. FILISETTI-COZZI and N. C. CARPITTA, Anal. Biochem. 197, pp. 157–162, (1991)] and using glucuronic acid as standard. The interference of neutral hexoses was avoided by using potassium sulphamate and by proceeding with controls comprising all the reagents with the exception of m-hydroxybiphenyl.

The sulphate content of the fractions was determined by elemental analysis of sulphur (S %), and by applying the following relation: percentage of sulphate groups (%)=3.22×S %.

Nitrogen was determined by elemental analysis. The quantities found are always very low and no trace of the presence either of protein fragments or of amino acids, or of sugars containing nitrogen was detected. Consequently, the results of the determination are given in pure nitrogen (g/100 g).

The sugar composition was determined by gas-phase chromatography.

The anticoagulant activity of each of the samples of fucan was determined by measurement of the ACT (Activated Cephalin Time) using the ACT kit (ORGANON TEKNIKA).

100 μl of a control buffer, or alternatively of a heparin solution at different dilutions (0 to 1 μg/ml) (H410, Institut Choay, SANOFI, 170 IU/mg) or of dilutions of fucan (0 to 50 μg /ml) are mixed with 100 μl of platelet-poor plasma (PPP) and 100 μl of ACT reagent. The whole mixture is incubated for 3 minutes at 37° C. The formation time of the clot is measured after the addition of 100 μl of a 25 mM $CaCl_2$ solution.

Results

Three degradations were carried out under the same conditions according to the protocol described above, starting from P1, EA and FS.

Several withdrawals were carried out in the course of the depolymerization and analysed by HPSEC.

The chromatographic profiles in the course of time are represented in FIG. 1. A fraction of molecular weight 66,000 g/mol is obtained in 30 minutes (FIG. 1A). This product, however, is not sufficiently homogeneous (shoulder at 19,000 g/mol). Between 60 and 300 minutes, the polysaccharide moves towards a product of molecular weight 9000 g/mol which this time has a homogeneous chromatographic profile (FIG. 1H).

The results are collected in Table I below. The fractions obtained, at the end of 300 minutes starting from B1, EA and FS, are respectively denominated DRP1, DREA and DRFS.

The amount of uronic acids in the fractions originating from the depolymerizations decreases although the amount of fucose varies little (Table I). On the other hand, the amount of sulphates of DRP1 and DRFS increases strongly but remains constant in the case of DREA.

TABLE 1

| Name | Yield (g/100 g) | Uronic acid (g/100 g) | Fucose (g/100 g) | —SO$_3$Na (g/100 g) | Nitrogen (g/100 g) | Mc (g/mol) | I = $\overline{Mw}/\overline{Mn}$ | Anti-coagulant activity (IU/mg) |
|---|---|---|---|---|---|---|---|---|
| P1 |  | 11.6 ± 0.8 | 35.8 ± 0.2 | 18.4 ± 0.3 | 0.2 | 516,000 100,000 | ND | 10.1 ± 2.0 |
| DRP1 | 50 | 6.5 ± 0.5 | 32.2 ± 0.1 | 30.1 ± 0.0 | 0.1 | 7800 | 2.1 | 6.8 ± 1.0 |
| EA |  | 5.7 ± 0.4 | 31.3 ± 0.1 | 26.1 ± 0.1 | 0.2 | 556,000 | ND | 9.1 ± 2.0 |
| DREA | 47 | 2.6 ± 1.1 | 36.4 ± 0.1 | 29.7 ± 0.5 | 0.1 | 8300 | 1.8 | 7.7 ± 1.0 |
| FS |  | 9.1 ± 0.8 | 46.4 ± 0.3 | 22.5 ± 0.2 | 0.8 | 94,000 30,000 | ND | 8.7 ± 1.0 |
| DRFS | 45 | 2.3 ± 0.3 | 40.9 ± 0.3 | 31.0 ± 0.3 | 0.2 | 7000 | 1.2 | 4.0 ± 1.0 |

ND: not determined (fraction too heterogeneous)
Mc: chromatographic molecular weight determined at the top of the peak
$\overline{Mw}$: weight-average molecular weight.
$\overline{Mn}$: number-average molecular weight.

EXAMPLE 2

The starting material is an acid extract EA, obtained like the acid extract used in Example 1.
Free-radical Depolymerization 4.5 g of crude fucan EA are dissolved in 150 ml of a 0.02 M solution of copper acetate monohydrate in a reactor maintained at 60° C. A solution of 9% (v/v) of hydrogen peroxide is added at a rate of 1.5 ml per minute, for 5 hours. The pH is kept at 7.5 by continuous addition of 2M NaOH. The pH is adjusted to 5 with acetic acid and then the chelating resin CHELEX® 100 (BIORAD) is added in order to eliminate the copper contaminant from the medium. After neutralization by 0.1 M sodium hydroxide, the solution is desalted and lyophilized.

The results of the depolymerization reaction are summarized in Tables II and III below. The depolymerization product is denominated EADR.

TABLE II

| EA (g) | EADR (g) | Yield (g/100 g) | Mc (g/mol) |
|---|---|---|---|
| 4.5 | 2.0 | 44 | 6400 |

TABLE III

| Name | Uronic acid | Fucose | —SO$_3$Na | Nitrogen | Mc | Anti-coagulant activity |
|---|---|---|---|---|---|---|
| EA | 5.7 (±0.4) | 31.3 (±0.1) | 26.1 (±0.1) | 0.2 | 566,000 | 9.1 (±2.0) |
| EADR | 1.2 (±0.1) | 40.0 (±0.2) | 31.4 (±0.2) | 0.1 | 6400 | 6.8 (±1.0) |

The contents of uronic acid, fucose, —SO$_3$Na and nitrogen are expressed in g/100 g; Mc is expressed in g/mol; the anticoagulant activity is expressed in IU/mg.
Fractionation by Ion-exchange Chromatography 1 g of EADR was fractionated by ion-exchange chromatography on a column (2.6×5×40 cm) of DEAE SEPHAROSE® CL6B (PHARMACIA).

Figure 2:
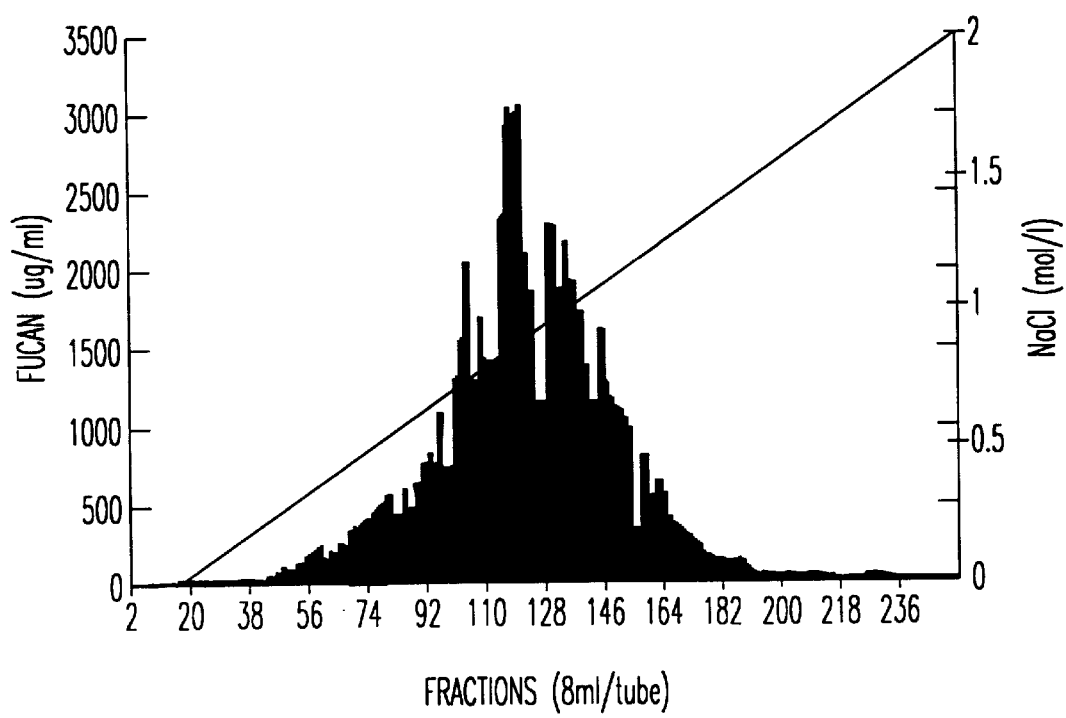

Elution was carried out at a rate of 1.6 ml/min, initially with water, and then with a linear gradient (0 to 2 M) of NaCl. Elution was followed with the aid of a conductimetric detector (IBF); FIG. 2 shows an elution profile.

Two fractions (EADREI1 and EADREI2) corresponding to the part collected by elution of the NaCl gradient were collected, respectively at ionic strengths corresponding to 0.75 M NaCl and 1.5 M NaCl.

The characteristics of these fractions are indicated in Table IV below. The amounts of uronic acid, fucose, —SO$_3$Na and nitrogen are expressed in g/100 g; Mc is expressed in g/mol; the anticoagulant activity is expressed in IU/mg.

TABLE IV

| Name | Uronic acid | Fucose | —SO$_3$Na | Nitrogen | Mc | Anti-coagulant activity |
|---|---|---|---|---|---|---|
| EADREI1 | 2.2 (±0.5) | 6.2 (±0.3) | 12.8 (±0.1) | 0.4 | 2500 | 0.5 (±0.2) |
| EADREI2 | 1.2 (±0.1) | 56.7 (±0.2) | 35.5 (±0.2) | traces | 7200 | 11.3 (±2.0) |

The fraction EADREI1, collected at low ionic strength, has a high level of uronic acids and a relatively low anticoagulant activity. On the contrary, EADREI2 is richer in sulphate groups and in fucose, and its anticoagulant activity is more significant.

EXAMPLE 3
Comparison of the properties of Fractions Obtained by a Method in Accordance With the Invention, With Fractions of the Same Molecular Weight Obtained by Acid Hydrolysis The fractions DREA and Q3 were both obtained starting from a crude fucan preparation EA.

The fraction DREA was obtained by the method of free-radical depolymerization in accordance with the invention, under the conditions described in Example 1.

The fraction Q3 was obtained by acid hydrolysis (1N H$_2$SO$_4$, 45° C., 90 minutes) of the crude fucan EA.

The characteristics of these fractions are indicated in table V below.

TABLE V

| Name of the fraction | DREA | Q3 |
|---|---|---|
| Yield (g/100 g) | 47 | 10 |
| Uronic acid (g/100 g) | 2.6 ± 0.1 | 4.8 ± 0.4 |
| Fucose (g/100 g) | 36.4 ± 0.1 | 43.3 ± 0.1 |
| —SO$_3$Na (g/100 g) | 29.7 ± 0.5 | 27.3 ± 0.2 |
| Nitrogen (g/100 g) | 0.1 | 0.1 |
| Mc (g/mol) | 8300 | 9300 |
| I ($\overline{Mw}/\overline{Mn}$) | 1.8 | 1.4 |

TABLE V-continued

| Name of the fraction | DREA | Q3 |
|---|---|---|
| Anticoagulant activity (IU/mg) | 8.2 ± 1 | 4.2 ± 1 |

We claim:

1. A method of obtaining a sulfated polysaccharide comprising:
   a) adding to a volume of a reaction mixture V1, which comprises of crude fucan originating from algae of Phaeophyceae at a concentration of 5 mg/mL to 100 mg/mL and a metallic catalyst, a volume of V2 which comprises of a solution of hydrogen peroxide at a concentration of 5% to 30% by volume, wherein the addition is conducted continuously with stirring for 0.5 hours to 10 hours at a rate per minute of V1/1000 to V1/10 and wherein the reaction mixture is maintained at a pH of 6 to 8 by continuous addition of sodium hydroxide, and is conducted at a temperature of 40° to 70° C.; and
   b) collecting the sulfated polysaccharide.

2. The method of claim 1, wherein the crude fucan is present in the reaction mixture at a concentration of 10 mg/ml to 50 mg/ml.

3. The method of claim 1, wherein a solution of hydrogen peroxide is added at a concentration of 5% to 20 %, by volume, at a rate of V1/50 to V1/500.

4. The method of claim 1, wherein the metallic catalyst is present in the reaction mixture at a concentration of 0.01 M to 0.1 M.

5. The method of claim 1, wherein ion-exchange chromatography is carried out either before or after step a).

6. The method of claim 5, wherein said chromatography is on DEAE-Sepharose CL6B.

7. The method of claim 6, wherein elution of the sulfated polysaccharide is at an ionic strength corresponding to a NaCl concentration of greater than 0.8 M.

8. The method of claim 6, wherein elution of the sulfated polysaccharide is at an ionic strength corresponding to a NaCl concentration of greater than 1 M.

9. The sulfated polysaccharide obtained by the method of claim 1, wherein the molecular weight of the sulfated polysaccharide is lower than or equal to 10,000 g/mol.

10. The sulfated polysaccharide of claim 9, having anticoagulant activity of at least 4.0 IU/mg.

11. The sulfated polysaccharide of claim 9, having anticoagulant activity of at least 6.8 IU/mg.

* * * * *

UNITED STATES PATENT AND TRADEMARK OFFICE
CERTIFICATE OF CORRECTION

PATENT NO. : 6,025,191

DATED : February 15, 2000

INVENTOR(S) : Michael Pfreundschuh

It is certified that error appears in the above-identified patent and that said Letters Patent is hereby corrected as shown below:

On the Title Page: in the section entitled <u>Attorney, Agent, or Firm,</u> change "Felfe & Lynch" to -- Fulbright & Jaworski L. L. P. --.
In <u>column 4, line 13,</u> change "repone" to -- response --.
In <u>column 13, line 9,</u> change "partner" to -- partners --.

Signed and Sealed this

Twenty-seventh Day of March, 2001

Attest:

NICHOLAS P. GODICI

Attesting Officer

*Acting Director of the United States Patent and Trademark Office*